United States Patent [19]
Otake

[11] Patent Number: 5,641,072
[45] Date of Patent: Jun. 24, 1997

[54] METHOD FOR SORTING POST-CONSUMED BOTTLES AND APPARATUS THEREOF

[75] Inventor: Yoshiyuki Otake, Osaka, Japan

[73] Assignee: Kurimoto, Ltd., Japan

[21] Appl. No.: 357,272

[22] Filed: Dec. 13, 1994

[30] Foreign Application Priority Data

Apr. 12, 1994 [JP] Japan .................................. 6-099269

[51] Int. Cl.$^6$ .............................. B07C 5/00; B07C 5/342; B07C 9/00
[52] U.S. Cl. ........................... 209/524; 209/525; 209/529; 209/580; 209/655; 209/698; 209/910; 209/920; 209/934; 198/396; 198/459.6; 198/460.1; 198/461.3
[58] Field of Search ..................... 209/522, 523, 209/524, 525, 529, 539, 555, 576–577, 580, 586, 655, 698, 707, 908, 910, 911, 920, 934, 939; 198/396, 443, 459.6, 370.3, 460.1, 463.4, 459.1, 459.7, 461.1, 461.2, 461.3

[56] References Cited

U.S. PATENT DOCUMENTS

| | | | |
|---|---|---|---|
| 3,425,530 | 2/1969 | Carter | 198/396 |
| 3,628,648 | 12/1971 | McClusky | 198/443 X |
| 3,930,994 | 1/1976 | Conway et al. | 209/698 X |
| 3,930,995 | 1/1976 | Paddock et al. | 209/698 |
| 3,955,179 | 5/1976 | Planke | 209/525 X |
| 4,142,636 | 3/1979 | Planke | 209/524 |
| 4,262,807 | 4/1981 | Leverett | 209/698 X |
| 4,574,939 | 3/1986 | Dubuit | 198/396 |
| 4,625,107 | 11/1986 | Planke | 209/525 X |
| 4,830,173 | 3/1989 | Hartness et al. | 198/463.4 X |
| 5,068,835 | 11/1991 | Reed | 209/524 X |
| 5,141,110 | 8/1992 | Trischan et al. | 209/524 |
| 5,259,513 | 11/1993 | Tahkanen et al. | 209/522 X |
| 5,314,072 | 5/1994 | Frankel et al. | 209/524 X |

FOREIGN PATENT DOCUMENTS

4305562 9/1994 Germany .................. 209/580

*Primary Examiner*—Boris Milef
*Attorney, Agent, or Firm*—Jones, Tullar & Cooper, P.C.

[57] ABSTRACT

The present invention provides a method for sorting post-consumed bottles exactly and efficiently and an apparatus for carrying out the method. The sorting apparatus comprises a supply section, a separating section, a detecting section comprising a first image pickup camera for detecting the size and contour of each post-consumed bottle and a second image pickup camera for high speed detection of color by a defined image pickup utilizing data from the first image pickup camera, a sorting section for sorting and discharging only post-consumed bottles already classified to sorting containers preliminarily placed in accordance with data received from the detecting section, and a control section for controlling a series of operations timely. Since the scope of the image pickup for detecting color of the post-consumed bottles is defined in accordance with the data from the detecting section, picture processing at a high speed is achieved resulting in remarkable sorting performance.

13 Claims, 13 Drawing Sheets

METHOD FOR SORTING POST-CONSUMED BOTTLES AND APPARATUS THEREOF

BACKGROUND OF THE INVENTION

1. Field of the Invention

The present invention relates to a technique for collecting and recycling used or post-consumed bottles included in municipal waste received from home and industry, or collected from distributors.

2. Prior Art:

Reflecting the diversification in life style due to the abundance of materials, municipal waste discharged domestically and industrially has been constantly increasing, and all local governments are now facing a serious problem of how to take an effective and strong measure to achieve a quantitative reduction of waste materials as well as an effective recycling thereof. As a result of the "Law Concerning the Promotion of Recycling of Resources", classification of those post-consumed bottles collected and which amount to a large percentage of the waste material collected, has become an object of public attention as one of the important social needs. Municipal waste is delivered to the disposal department under the condition that pieces of broken glass such as those of post-consumed bottles, scraps of ferrous and non-ferrous materials, waste plastic, and waste papers are randomly mixed. The delivered waste is subject to classification into several patterns of materials, and a part of them worthy to be recycled is recovered as a raw material to be redissolved and recycled. Many attempts have been heretofore proposed and put into practical use as to the mentioned recycling stages, attention being mainly focussed on how to classify the waste materials with high efficiency. For example, Japanese Patent Publication (unexamined) No. Hei 4-354577 discloses a technique for separating post-consumed cans, post-consumed bottles, and post-consumed paper containers from one another within one case, and in which they are separately crushed.

Recently, in conformity with a strong administrative request from local governments in most municipalities, a way of classification by material is to be performed at the stage of collecting the waste materials on every family and, accordingly, a lot of techniques developed and directed exclusively to the classification of waste glass products have been also proposed. In recycling of glass products, one of the important aspects is a classification of the used glass products color by color because it is a requirement for improving recycling by redissolve post-consumed glass products of similar color.

For example, Japanese Patent Publication (unexamined) No. 5-96249 discloses a method for classifying small pieces of post-consumed glass (hereinafter with reference to this publication referred to as "cullet") by several color groups comprising the steps of detecting a color of a cullet by detecting the image of each cullet using a CCD camera while conveying the cullets on a belt conveyor and performing picture processing, sucking air by opening a specific suction port of a number of suction ports according to a signal from the picture processing provided on a classification drum disposed at one end of the conveyor, thus classifying cullets of specific color while dropping cullets of other colors by utilizing their weight.

To handle a large number of post-consumed bottles efficiently, it is strongly desired that a systematic and complete apparatus be constructed in addition to excellent individual classification techniques.

Figure 15:
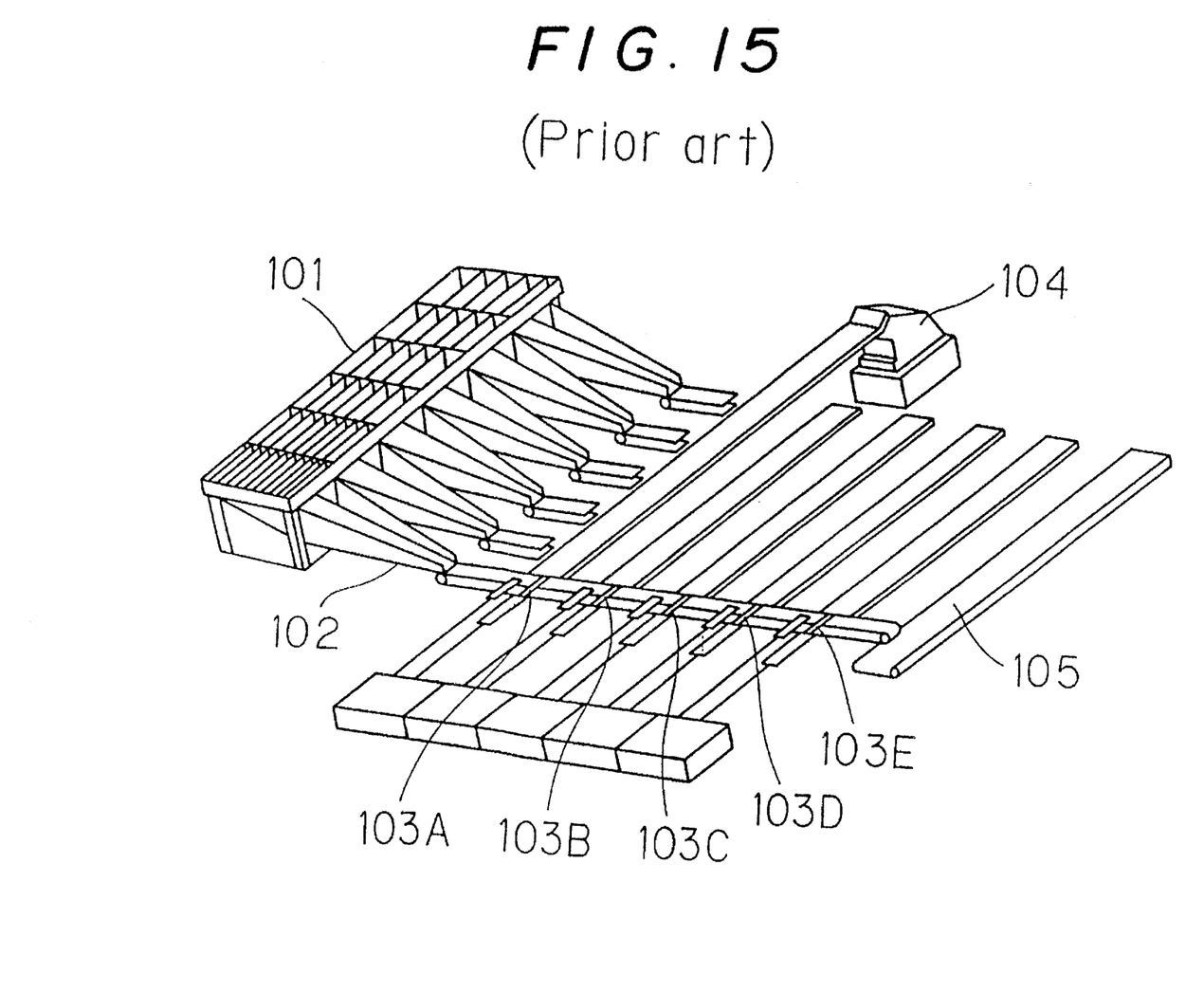
FIG. 15 is a perspective view showing a prior apparatus.

FIG. 15 shows the prior art apparatus disclosed in Japanese Patent Publication (unexamined) No. Sho 4-367774 comprising a classifying and vibrating screen 101 for classifying post-consumed bottles size by size, a feeder 102 for causing the classified post-consumed bottles to be in a row and in one direction, color sensors 103A to 103E for detecting the color of each of the fed post-consumed bottles, a dispenser 105 for delivering the post-consumed bottles classified color by color respectively to a disposal section (crushing section 104). Each of the color sensors has a function of detecting any one of transparent, brown, blue, green, and black colors of the post-consumed bottles conveyed on the belt conveyor, and upon identifying a color, a signal for actuating an electromagnetic switch is generated to transfer the bottle of specific color to a belt conveyor of the dispenser. As a result, as is described in this publication, the classification work of glass bottles conventionally conducted manually is automated, largely contributing to recycling of resources.

Post-consumed bottles are collected not only as a raw material classified color by color to be redissolved, but also to have them refilled. For this purpose, it has been heretofore customarily adopted that they be collected without defect and, after being subject to inspection, cleaning and sterilization, refilling them as new bottles. Particularly regarding alcoholic liquors, it is well-known business custom to sell alcoholic liquors and collect post-consumed bottles. However, the types of post-consumed bottles collected by alcoholic liquor dealers have been increasingly diversified recently. Such diversification including 1.8 l, 0.9 l, 0.54 l, 0.18 l, beer bottles of large, medium and small sizes, juice bottles of large and small sizes, ampoule bottles, etc. Since adoption of proper shape, size and color aiming at characteristic and discriminative goods, is an important prevailing business strategy actually, exact classification of the collected bottles type by type has become all the more difficult and complicated.

The mentioned prior art shown in FIG. 15 already faces a serious restriction when classifying by bottle size, if it is intended to recycle post-consumed bottles with their shapes as they are. That is, in the classification of post-consumed bottles size by size employing vibrating screens of various mesh sizes, it is quite difficult to exactly catch various shapes of post-consumed bottles by such a classification method. Accordingly, this prior art apparatus is not applicable, an apparatus for recycling the post-consumed bottles with their shapes as they are because of their excessively rough classification, though it may be useful for achieving a secondary object of conveyance for the classification by color on the condition that they are finally crushed. Also, a method for classifying various sizes of post-consumed bottles size by size with the use of vibration after inputting various sizes of post-consumed bottles all at once, an excessively large shock may be given to every bottle, whereby there is a high possibility of breaking or damaging the bottles. Thus, the prior art disclosed in the Japanese Patent Publication Hei 4-367774 is far from being applicable to the recycling of post-consumed bottles with their shapes as they are.

The prior art shown in FIG. 15 has a further disadvantage of requiring a very large installation space, since post-consumed bottles are classified size by size and each size is identified by passing them right under various color sensors in the course of a long conveyance, resulting in low detection efficiency and a classification performance of very low level.

Under such circumstances, one of the primary social needs now is that post-consumed bottles collected through alcoholic liquor dealers be generally accepted, and that many types of reusable bottles be efficiently classified and recycled as much as possible, while local governments use their utmost efforts for reducing the entire volume of waste materials. In other words, a system for easily and sufficiently satisfying the mentioned intricate and complicated needs is eagerly desired, particularly one usable on the actual working cite.

SUMMARY OF THE INVENTION

The present invention was developed to solve the above-discussed problems and has as an object that of providing a method for efficiently and exactly classifying and collecting post-consumed bottles, and, to an apparatus for carrying out the method.

To accomplish the foregoing object, a method for sorting post-consumed bottles according to the present invention comprises the steps of: charging post-consumed bottles the contour, size and color of which are mixed randomly into a hopper; causing the post-consumed bottles to form a row in the longitudinal direction thereof through a supply port provided on the lower side of the hopper while applying a certain vibration thereby moving forward the post-consumed bottles one by one on a supply conveyor; separating each bottle to have a certain distance between one bottle and another by intermittently interrupting a moving flow of the bottles by a gate regularly opening and closing on a separation conveyor onto which the moving post-consumed bottles are delivered; detecting the contour and size of each bottle by processing an image picked up by a first image pickup camera on a detection conveyor onto which the separated bottle is delivered; detecting color at a high speed by picking up an image by a second image pickup camera, the image being defined by data obtained by the former detection step; and discharging the post-consumed bottles the size, shape and color of which have been detected at predetermined positions by the type of bottle which has been preliminarily established.

It is also preferably that instead of using the first image pickup cameras, the size (length and width or diameter) of post-consumed bottles is approximately detected by an ultrasonic displacement sensor to establish basic data for color detection.

An apparatus for exclusive use in carrying out the mentioned sorting method according to the present invention comprises: a supply section for receiving post-consumed bottles charged randomly without order and moving the post-consumed bottles continuously in the longitudinal direction forming a row; a separating section for separating continuously each moving bottle to have a certain distance between one bottle and another; a detection section for picking up the contour, size and color of each post-consumed bottle and classifying the post-consumed bottles into several types according to predetermined standard bottle patterns; a sorting section for sorting and discharging the post-consumed bottles by said predetermined standard bottle patterns in accordance with data from the detecting section; and a control section for continuously controlling a series of operations of said respective sections and giving execution instructions.

In the mentioned method of sorting post-consumed bottles according to the present invention, since the post-consumed bottles of a variety of colors, sizes and contours are mixedly supplied and received into a hopper while a gentle vibration is imparted to them, the post-consumed bottles are moved downward while their posture is turned sideways. Since the application of a certain gentle vibration is sufficient just for turning the post-consumed bottles sideways, there is no possibility of damage to the post-consumed bottles. Then, the post-consumed bottles are delivered to the belt conveyor of the supply section through the supply port, and during this step, the post-consumed bottles are caused to form in a row in longitudinal direction. The interval or distance between one bottle and another delivered to the belt conveyor is different, i.e., long or short, but the flow of the moving bottles are intermittently interrupted in the separating section, whereby irregular distances between the bottles are rearranged to be within a range suitable for detection.

The post-consumed bottles delivered from the separating section to the belt conveyor of the detecting section are respectively subject to the image pickup when coming to a position right under the first image pickup camera, then each picked-up image is subject to picture processing, and picture elements thereof are counted, whereby the diameter and length of each bottle are detected from the counted value. The detected diameter and length are compared with the preliminarily stored standard bottle patterns, whereby bottle types are respectively identified, and the detected data are sent to the second image pickup camera and the sorting section through the controller. In the second image pickup camera, image pickup for detecting a selected color is performed according to the data information detected in the former step, and the result of picture processing thereof is subject to a color extractor in which a color proper to each post-consumed bottle under such color extraction is identified in comparison with standard sample colors, and a signal of the identified color is sent to the sorting section through the controller.

The sorting section receives information about each individual post-consumed bottle on the size, contour and color previously classified, and when each consumed bottle delivered from the detecting section coming to a position conforming to a classified bottle pattern applicable thereto, an operation is started to discharge the bottle out of the conveyor. Containers for receiving the post-consumed bottles by every classified pattern are disposed under the discharge position, thus the post-consumed bottles are sorted and recovered for each size, contour (shape) and color as predetermined.

As a matter of course, not all post-consumed bottles supplied can be recycled. It is often the case that a certain percentage of post-consumed bottles in the mixture are damaged to an extent that they cannot be recycled. To meet this, any post-consumed bottle with a broken mouth, for example, is judged at the stage of picture processing by the first image pickup camera that there is no applicable contour pattern for that bottle and, then, the bottle is just subject to the color detection to be collected as "another" resource for redissolution and supplied to an apparatus for redissolution after being crushed.

There may be a case in which broken products occupy a major percentage, thus recycling of the post-consumed bottles with their shapes as they are is not necessary, and accordingly what is required is exclusively a classification of color. In such a case, detection with high efficiency and at a high speed, and any exact acknowledgment of shape is not required. That is, depending upon actual need, it may be satisfiable to substitute a simple and inexpensive detector means such as an ultrasonic displacement sensor for the mentioned first image pickup camera in order to achieve the required function economically.

In the apparatus for sorting post-consumed bottles of the above construction, various electronic control mechanisms are disposed at several points on the way of moving post-consumed bottles in the entire apparatus thereby achieving complete automation and highly exact and accurate classification is realized which is not possible with the prior art, the apparatus thus being capable of keeping up with the recent trend of subdivision of diversified post-consumed bottles under the background of discriminative and characteristic design. Accordingly, the opportunity of recycling the post-consumed bottles with their shapes as they are can be largely expanded, thereby contributing to the worldwide policy of "save energy" being largely exhibited as compared with any conventional apparatus. Furthermore, since the time required for sorting a bottle is largely shorten, the handling performance per space is remarkably high as compared with any other known apparatus.

The above advantages of the present invention can be summarized from the technical viewpoint as follows:

(1) Projecting rails are provided in parallel to the running direction of the belt conveyor in the supply section, whereby post-consumed bottles lying on the belt conveyor can be conveyed without going zigzag in the circumferential direction of each round bottle even if the belt is flat.

(2) Since the distance between one post-consumed bottle and another is suitably arranged in the separating section, the time necessary for the identification in the detecting section can be minimized without more in the separating section, and the time necessary for the identification in the detecting section can be minimized without fail.

(3) Since an exact classification is performed size by size, shape by shape, and color by color in the detecting section, rebottling, i.e., recycling of post-consumed bottles can be sufficiently achieved.

(4) Since the size information is utilized in the subsequent color detecting section and only the pictures defined by establishing windows are processed, the time necessary for picture processing is largely shortened.

(5) In the case where classification of shape is not required, it is possible to switch the operation so that only the color detection can be simply performed at a high speed.

(6) Since the opening and closing operation of the buckets is instantaneously performed so as to discharge post-consumed bottles type by type, the time required for the discharge is considerably shortened.

(7) Since the apparatus according to the present invention comprises a row of sorting lines intersecting a row of detection lines, the entire space occupied by the apparatus is rather small in spite of high performance, thereby enabling a large amount of post-consumed bottles to be sorted at a relatively small premise.

Other objects, features and advantages of the present invention will become apparent in the course of the following description with reference to the accompanying drawings.

BRIEF DESCRIPTION OF THE DRAWINGS

In the drawings forming a part of the present application.

DESCRIPTION OF THE PREFERRED EMBODIMENT

Figure 1:
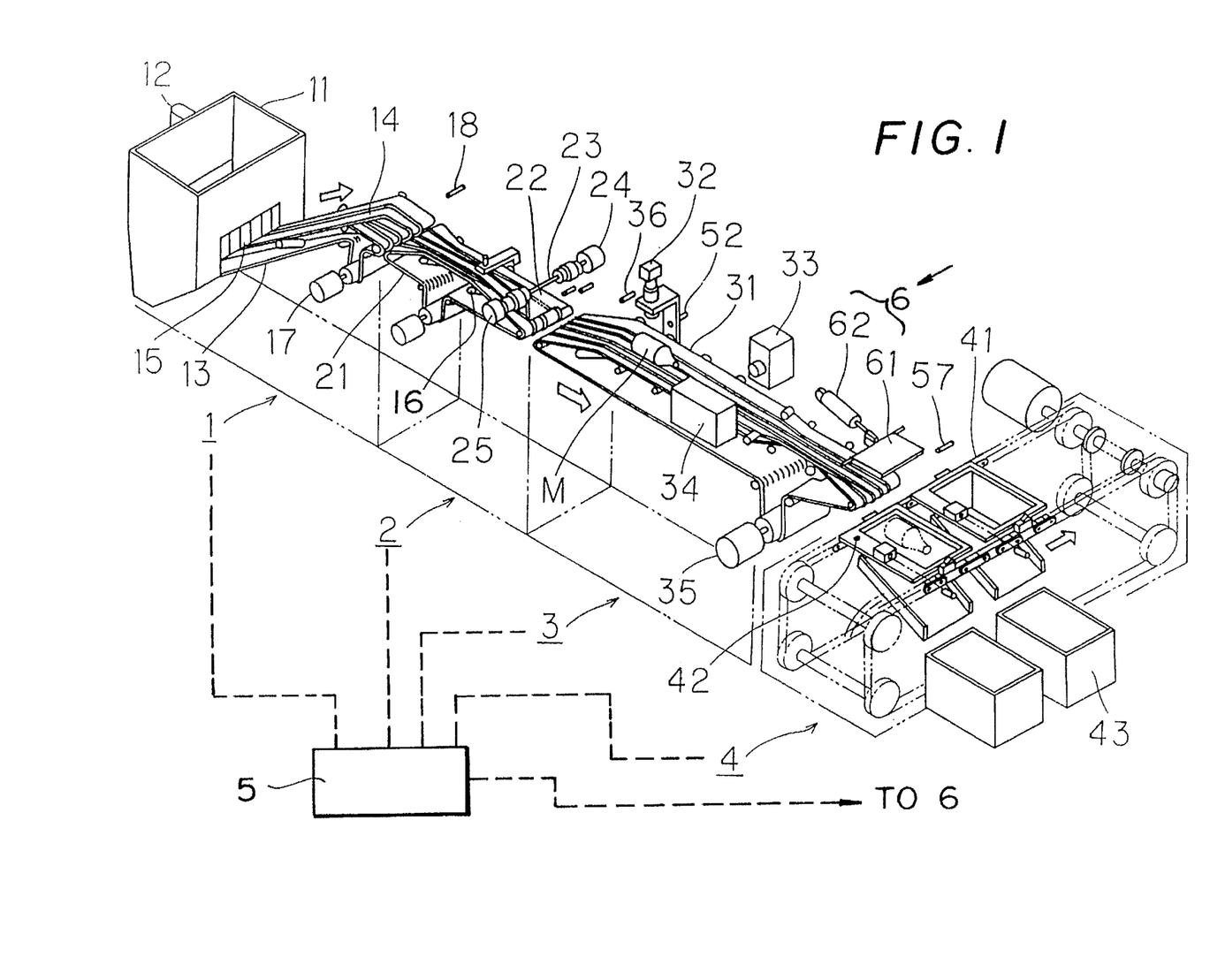
FIG. 1 is a perspective view of an apparatus according to an embodiment of the present invention.

Referring now to FIG. 1 showing an apparatus for sorting post-consumed bottles according to an embodiment of the present invention, the sorting apparatus comprises the supply section 1, separating section 2, detecting section 3, sorting section 4, and operation controller 5 for controlling the operation of each of the above sections.

Figure 2:
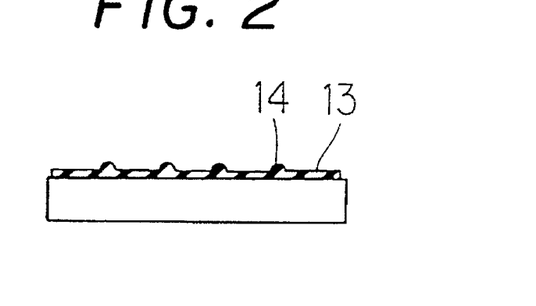
FIG. 2 is a sectional view of the belt conveyor of the supply section.
Figure 3:
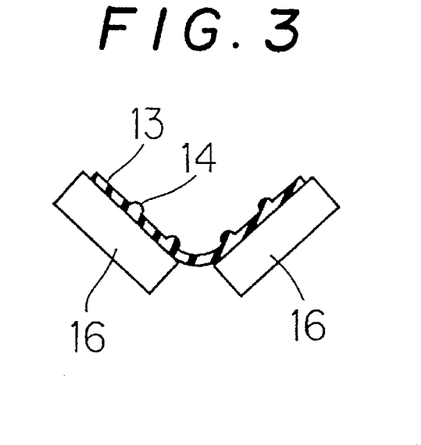
FIG. 3 is a sectional view of a different part of the belt conveyor of the supply section.

The supply section 1 comprises a hopper 11 having an inclined face which narrows in the downward direction, a vibrator 12 for applying a gentle vibration to the hopper, and a belt conveyor 13 connected to a supply port 15 provided on the lower side of the hopper 11. The belt conveyor 13 is provided with a plurality of projecting ribs 14 projecting and extending in the moving direction in the same manner as other subsequent belt conveyors as shown in FIG. 2, whereby all post-consumed bottles are put on the belt conveyor in such a manner that the longitudinal orientation of post-consumed bottles is uniformly corrected to be coincident with the moving direction of the belt conveyor. Further, inclined rollers 16 are provided which engage the belt conveyor 13 of the supply section thereby forcing the sectional view of the belt conveyor to form a V-shape as shown in FIG. 3. A post-consumed bottle M put placed on the belt conveyor 13 is brought to the laterally central portion of the belt conveyor. In addition, the belt conveyor 13 runs at an appropriate speed by driving a variable speed motor 17, and passage of any post-consumed bottle thereon is detected by a photoelectric sensor 18.

Figure 4:
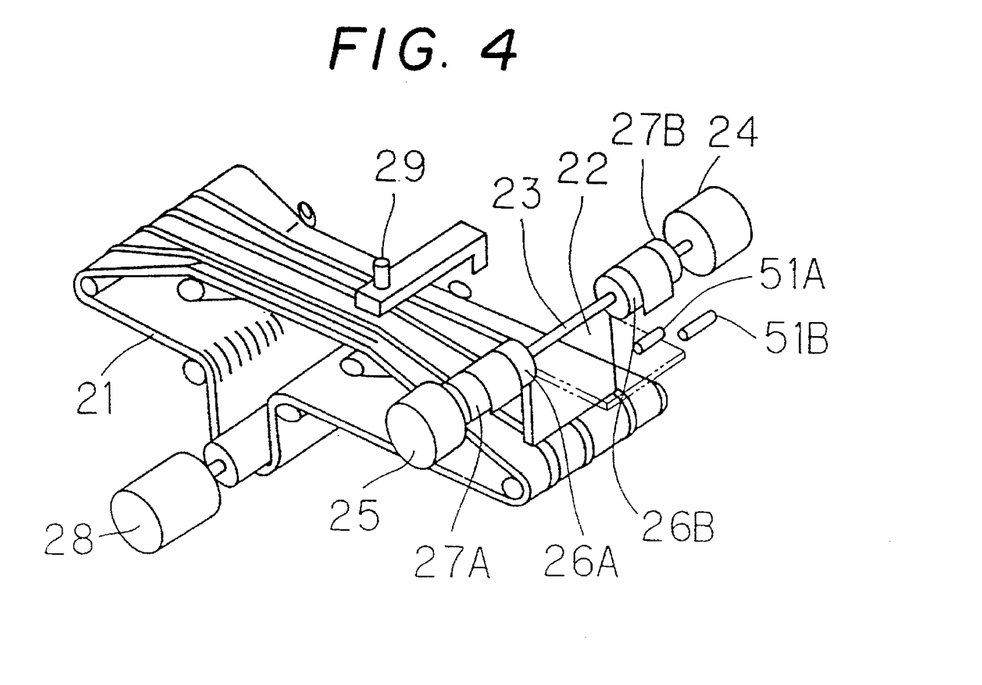
FIG. 4 is an enlarged perspective view of the separating section shown in FIG. 1.

FIG. 4 is an enlarged view of the separating section 2 shown in FIG. 1, and in this section the post-consumed bottles are delivered to a belt conveyor 21 running at a higher speed than the belt conveyor 13 of the supply section 1, and as a result of such difference in speed, the post-consumed bottles moving continuously but irregularly are individually separated in distance. The belt conveyor 21 runs at a speed adjusted by receiving the drive force of a variable speed motor 28, and passage of any post-consumed bottles thereon is detected by an ultrasonic sensor 29. Further, the movement of the post-consumed bottle M is subject to temporary interruption by a plate like gate 22 opening and closing intermittently at the end of the belt conveyor 21, thereby causing every post-consumed bottle to pass through the gate regularly so as to keep a certain distance between one bottle and another. In the embodiment shown in FIG. 4, a shaft 23 extending on two sides of the gate 22 is coupled with brakes 26A, 26B and clutches 27A, 27B. The clutches 27A, 27B are respectively coupled with motors 24, 25 rotating in opposite directions. When releasing the brakes 26A, 26B and actuating the clutch 27B during the counter-clockwise rotation of the motor 24, the gate 22 starts to turn quickly counter-clockwise together with the shaft 23, and after 90 degrees of rotation, a photoelectric sensor 51A is operated, whereby the clutch 27B is turned to OFF and the brakes 26A, 27B to ON, thus quickly stopping the operation of the gate 22. Then, the brakes 26A, 27A are turned to OFF and the clutch 27A to ON, and the shaft 23 of the gate comes couples with the motor 25 rotating clockwise, whereby the gate closes quickly and a photoelectric sensor 51B is operated to stop the flow. In this manner, as the gate opens and closes regularly at a certain interval so as to stop temporarily the flow of moving post-consumed bottles M and then permits the post-consumed bottles M to pass through the gate, every post-consumed bottle M is separated with a certain distance between one bottle and another and then delivered to the detecting section 3.

Figure 5A:
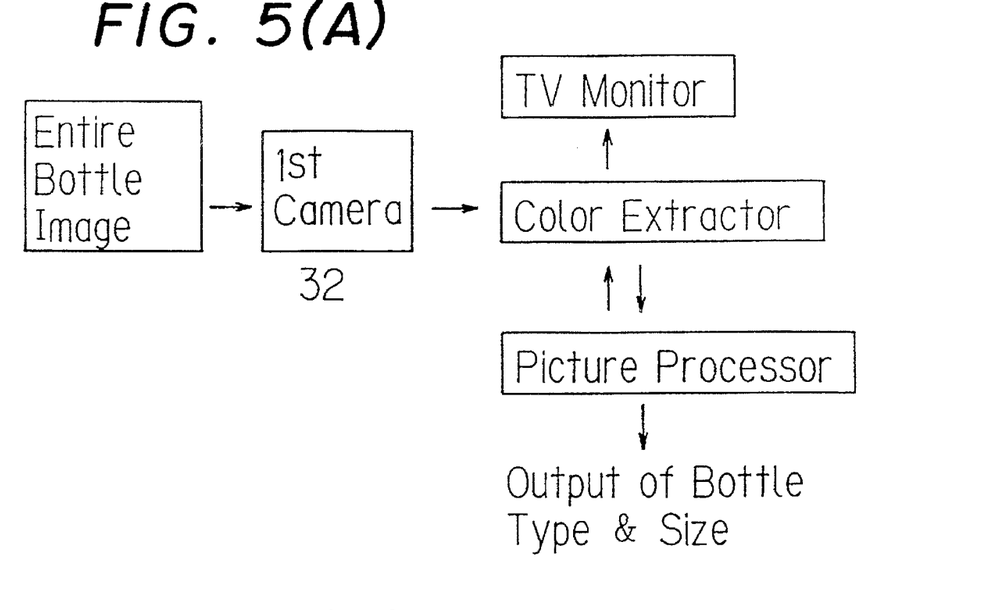
FIG. 5(A) is a block diagram to explain the operation of the first image pickup camera.

In the detecting section 3, a belt conveyor 31 runs at an appropriately adjusted speed by driving a variable speed motor 35. When any post-consumed bottle is delivered onto the belt conveyor 31, the presence of the bottle is detected by a photoelectric sensor 36. When the bottle moves forward and comes to a position right under a first image pickup camera 32, a photoelectric sensor 523 detects it and operates to press a shutter of this image pickup camera synchronously, thereby an image pickup of the bottle is performed. In such an instantaneous image pickup, an appearance (profile) of the post-consumed bottle M is detected and subject to picture processing; the diameter and length of the post-consumed bottle is immediately identified just by counting picture elements of the processed picture. At the same time, the identified diameter and length are compared with several pre-stored standard bottle patterns in the controller, thereby a specific pattern among those standard bottle patterns is recognized as a specific type of the post-consumed bottle.

Figure 5B:
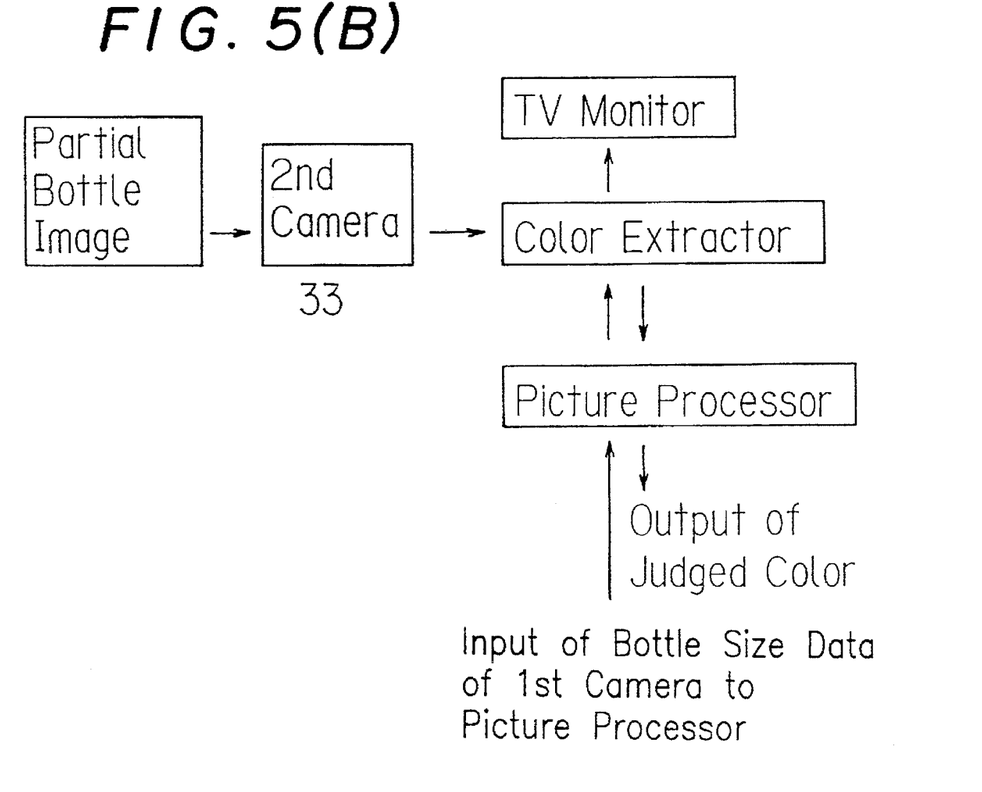
FIG. 5(B) is a block diagram to explain the operation of the second image pickup camera.

FIG. 5(B) is a flow chart explaining the mentioned series of operations. That is, when the moving post-consumed bottle M reaches right under the second image pickup camera 33, a light source (fluorescent light) 34 mounted on the opposite side of the camera 33 irradiates the post-consumed bottle M, and a transmitted light thereof is caught by the second image pickup camera 33. Since the diameter and length proper to the post-consumed bottle M have been already inputted to the controller 5 by the picture processing of the image pickup performed by the first image pickup camera 32, windows for color extraction can be established based on data obtained by the first pickup camera 32.

Figure 6A:
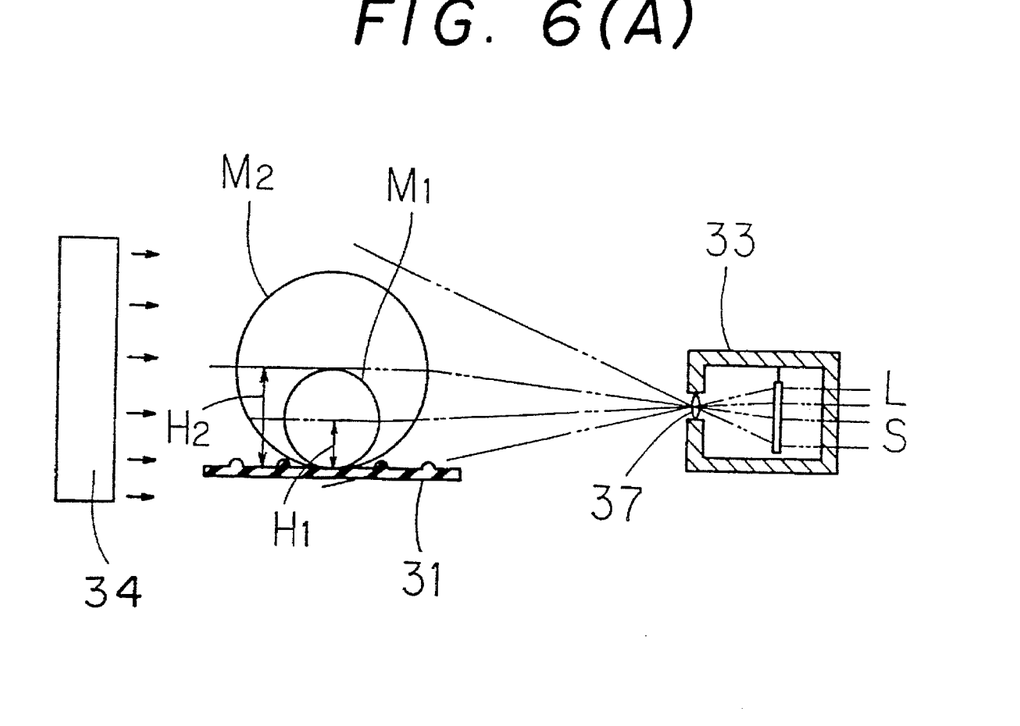
FIG. 6(A) is a side sectional view showing the operation of the detecting section.
Figure 6B:
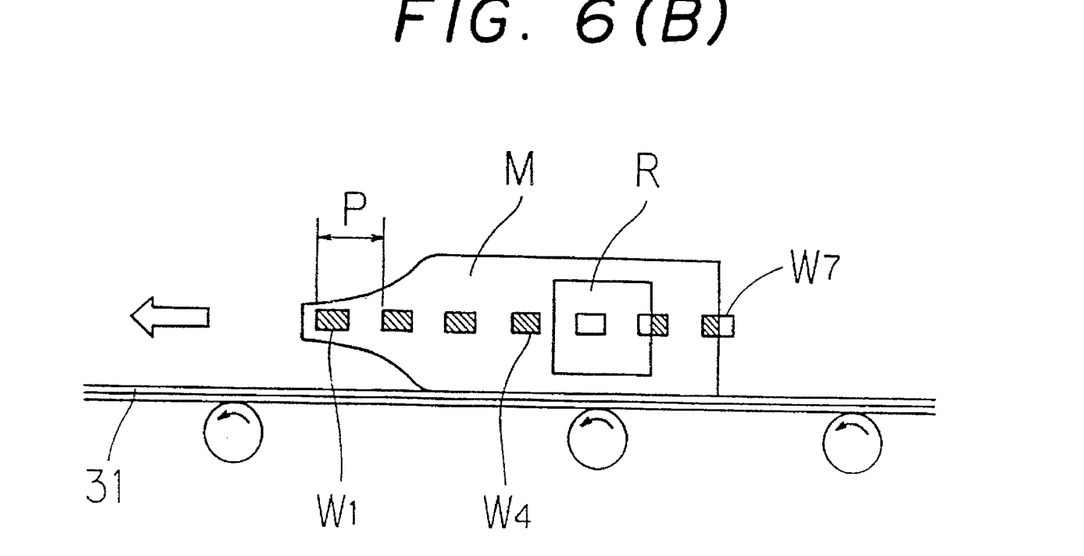
FIG. 6(B) is a front view showing the operation of the detecting section.

FIGS. 6(A), 6(B) are explanatory views of the sequential order of the steps for establishing the windows. Through a lens 37, in case of a large bottle M2, a picture element range L corresponding to a height H2 of the center of the large bottle M2 is established, while a picture element range S corresponds to a height H1 of the center of the bottle being established in the case of a small bottle M1. Since the post-consumed bottle M moves continuously forward in the running direction of the belt conveyor, when dividing the picture elements into a plurality of groups by providing a certain interval P between one group and another, windows W1, ..., Wn (W7 in this example) intermittently arranged along the center axis of the post-consumed bottle M are established according to the bottle type.

Detected color information is compared with sample colors to pick up or extract one sample color coincident to the color information from sample colors, and an operation for displaying the extracted color sample in the form of white is performed by a high speed picture color extractor. In this color extractor, a white percentage of the windows is calculated from the area of windows. For example, a criterion is established in which if there are three or more windows of which the white percentage is 70%, then the bottle color is judged identical to the sample color. White percentage and number of windows can be optionally established by inputting them as initial conditions to the controller 5. In this connection, it is often the case that a label is affixed to some post-consumed bottles, and it is established herein that any window overlapped or superposed on the label is judged to be 0% white so as not to be subject to the comparison with the sample colors. Explaining more specifically this operation in the case of the example shown in FIG. 6(B), seven windows Wi, ..., W7 are established on the surface of a post-consumed bottle M based on the preceding information, and the window W5 is overlapped by the label R, while the window W7 is partly overlapped by the bottom end of the bottle. This overlapping is excluded from the comparison with the sample colors. If the white percentage of the window W6 does not exceed an established value, then the window W6 is subject to the color picture processing in the same manner as the windows W1 to W4, and the post-consumed bottle M is judged a bottle of the same color as a white sample color. In this manner, as a result of adopting a system for judging a color by establishing the windows and applying a color picture processing only with respect to the color in the windows, the speed of color picture processing is remarkably improved. In an actual test, 5,000 bottles per hour wee sorted with this embodiment.

In addition, a restart section 6 is interposed on the front end of the sorting section 4. The restart section performs a function of automatically stopping the operation of the apparatus upon occurrence of any trouble, thus being effective to prevent serious breakdown, though every post-consumed bottle M can freely pass therethrough under normal operation as a matter of course. In this embodiment, the restart section 6 comprises a gate 61 which is opened and closed by a cylinder 62. The cylinder 62 is operated instantaneously by receiving a signal from the control section 5, upon occurrence of any malfunction in any of the upstream supply section 1, separating section 2, detecting section 3 and/or the downstream sorting section 4, and closes the gate 61 so as to interrupt temporarily the flow of moving post-consumed bottle M. Upon correction of the malfunction, the gate 61 is opened according to the instruction from the control section, thereby restarting the flow of the post-consumed bottles.

Figure 7:
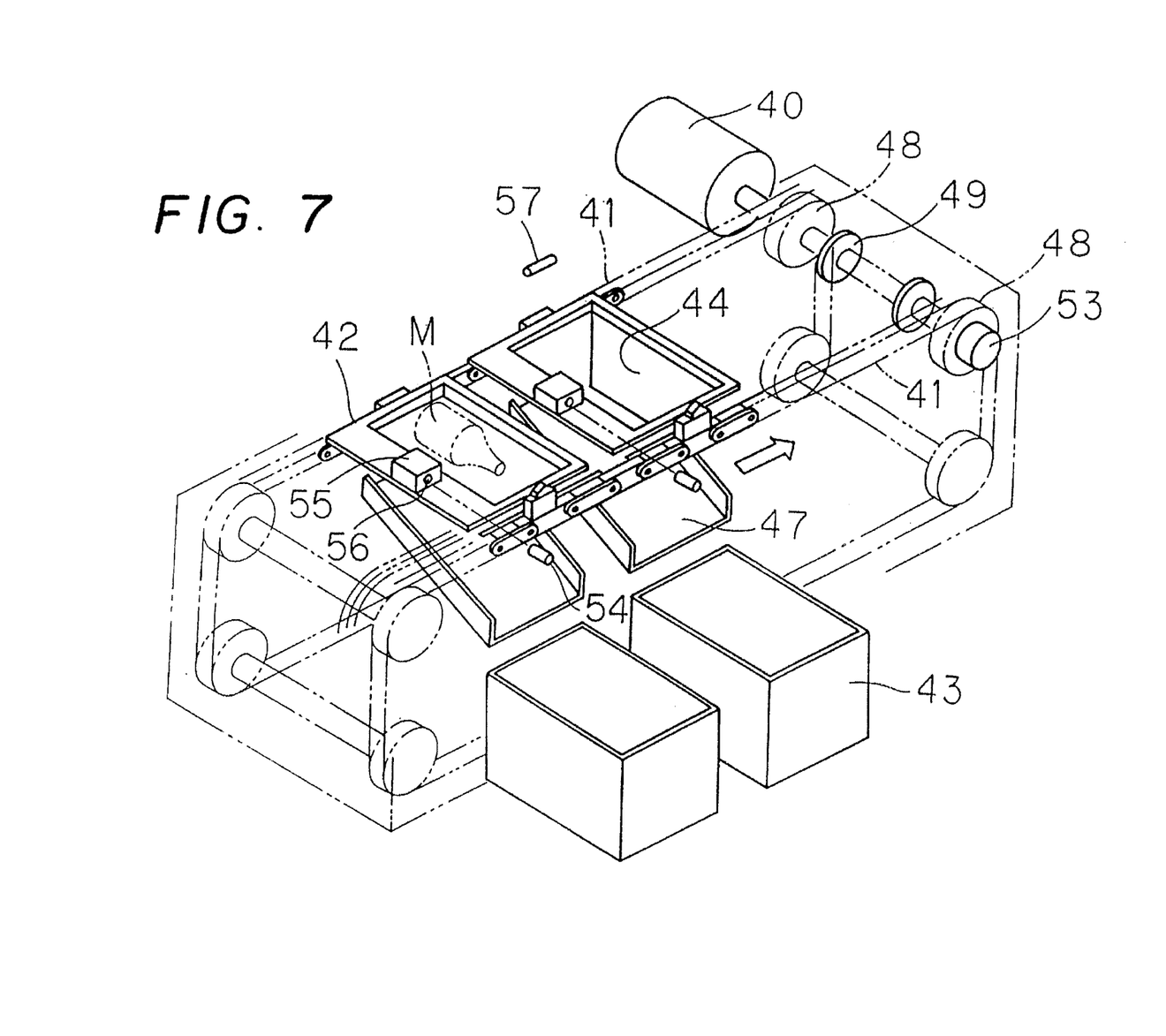
FIG. 7 is an enlarged perspective view of the sorting section shown in FIG. 1.

FIG. 7 is an enlarged view of the sorting section 4 shown FIG. 1, and FIGS. 8(A), 8(B) and 8(C) are sectional side views showing the operation of the sorting section 4. A plate-like bucket 42 is provided with a bottom plate 44 against a hinge 45 on the forward movement side of the bucket so that the bottom plate may freely open and close, and a backside of the hinge 45 is fixed to an electromagnet 46. The post-consumed bottle M, after leaving the end of the belt conveyor 31 of the detecting section 3 and delivered onto the bucket running in a direction perpendicular to that of the preceding sections, is placed on the bottom plate 44 and moves together with two chain conveyors 41 both running at an adjusted speed driven by a variable speed motor 40.

Figure 8A:
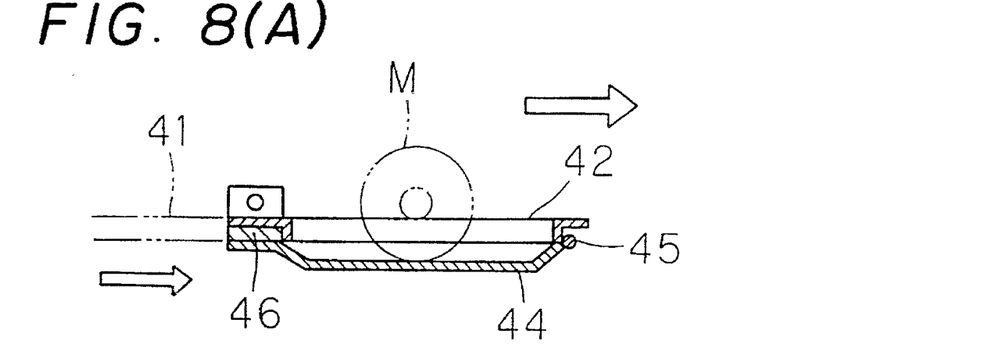
FIG. 8(A) shows the control section of the preferred embodiment with a closed bucket.

FIG. 8(A) shows a running state of the post-consumed bottle M placed on the bucket 42. Since size, contour and color have already been detected and classified into standard bottle patterns in the detecting section 3, the delivery of each post-consumed bottle M to the sorting section 4 is detected by an ultrasonic sensor 57, thus information as to the type of bottle to be placed on a given bucket is known by the control section and stored therein.

Figure 8B:
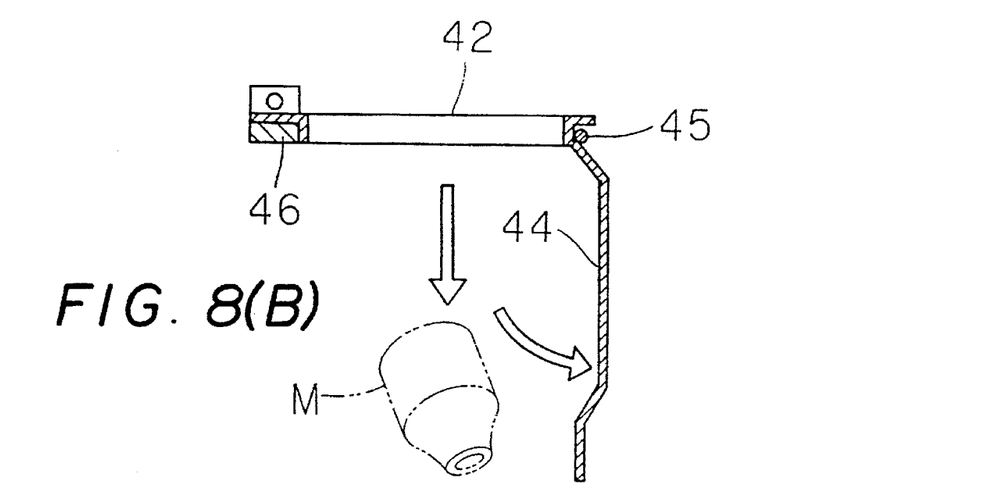
FIG. 8(B) shows the control section of the preferred embodiment with an open bucket.
Figure 8C:
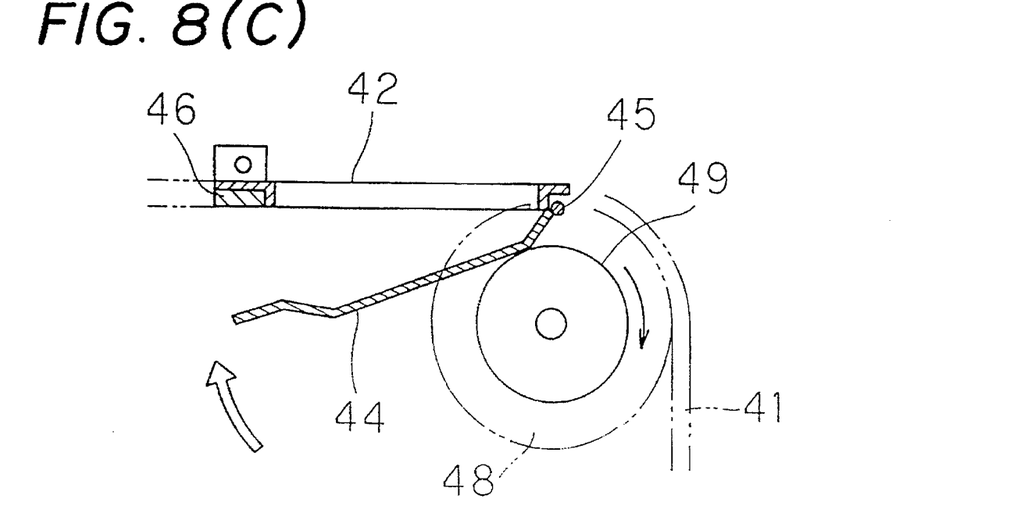
FIG. 8(C) shows the control section of the preferred embodiment with the bucket being closed.
Figure 9:
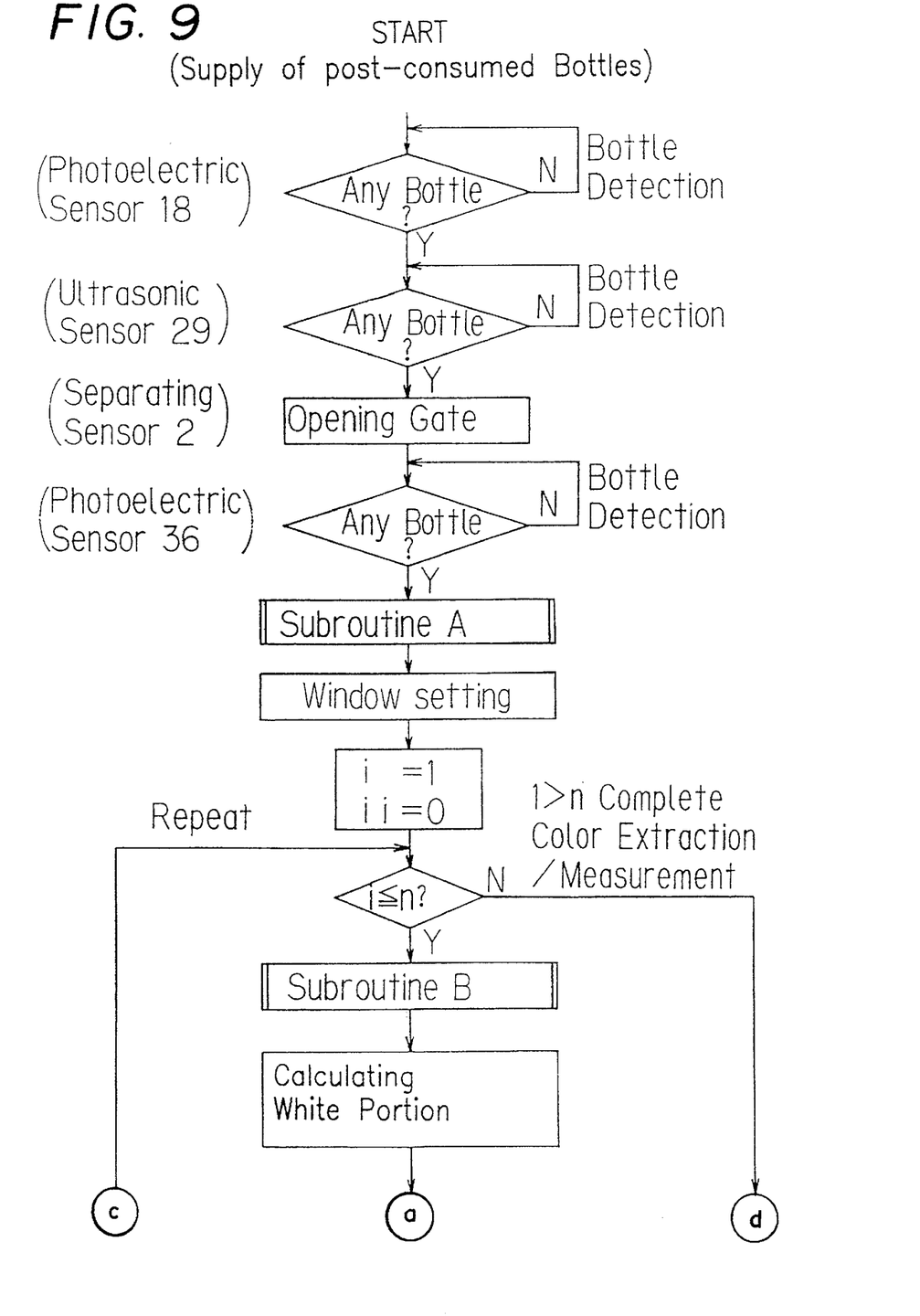
FIGS. 9 to 14 are flow charts to explain the operation of the control section of the preferred embodiment.
Figure 10:
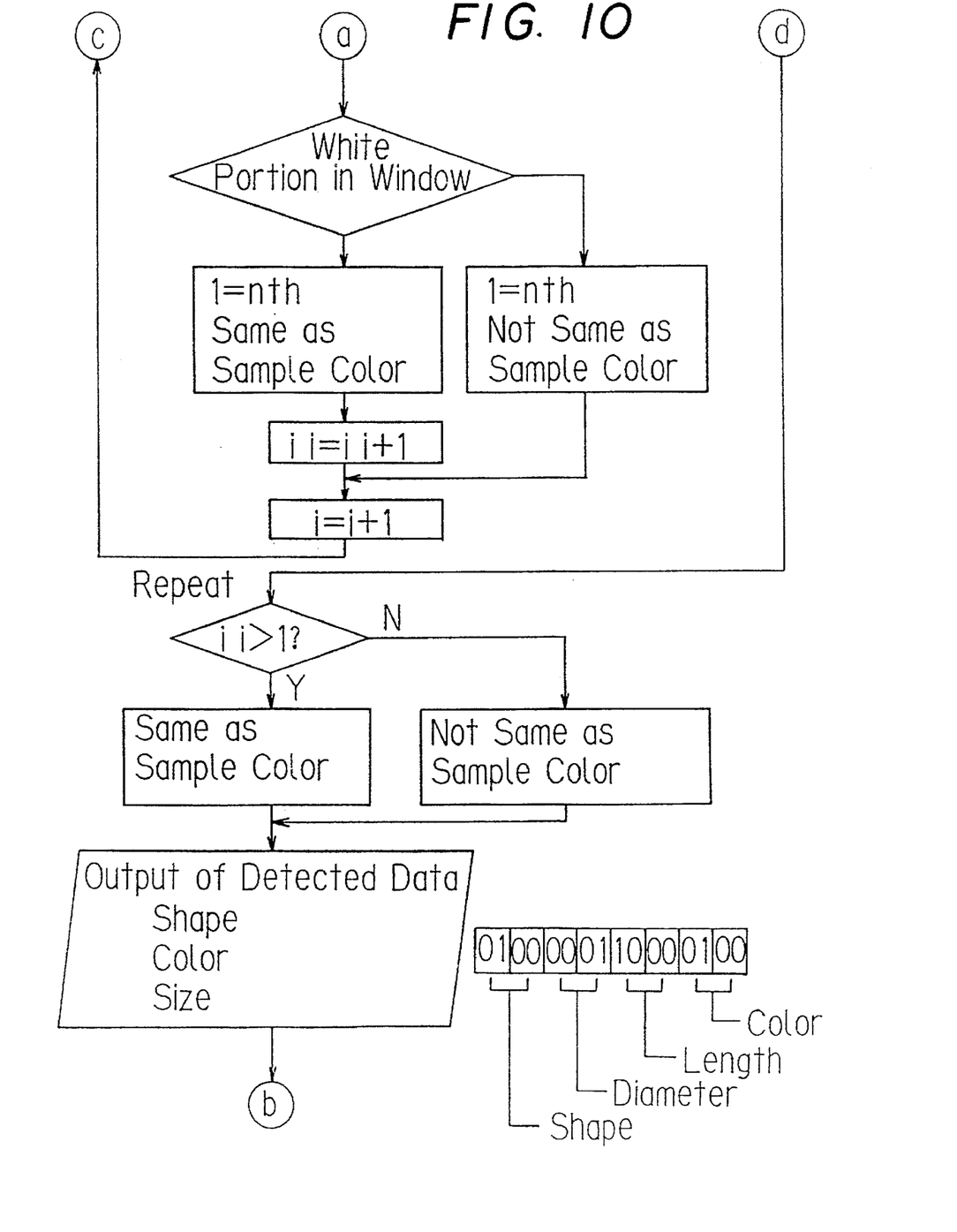
Figure 11:
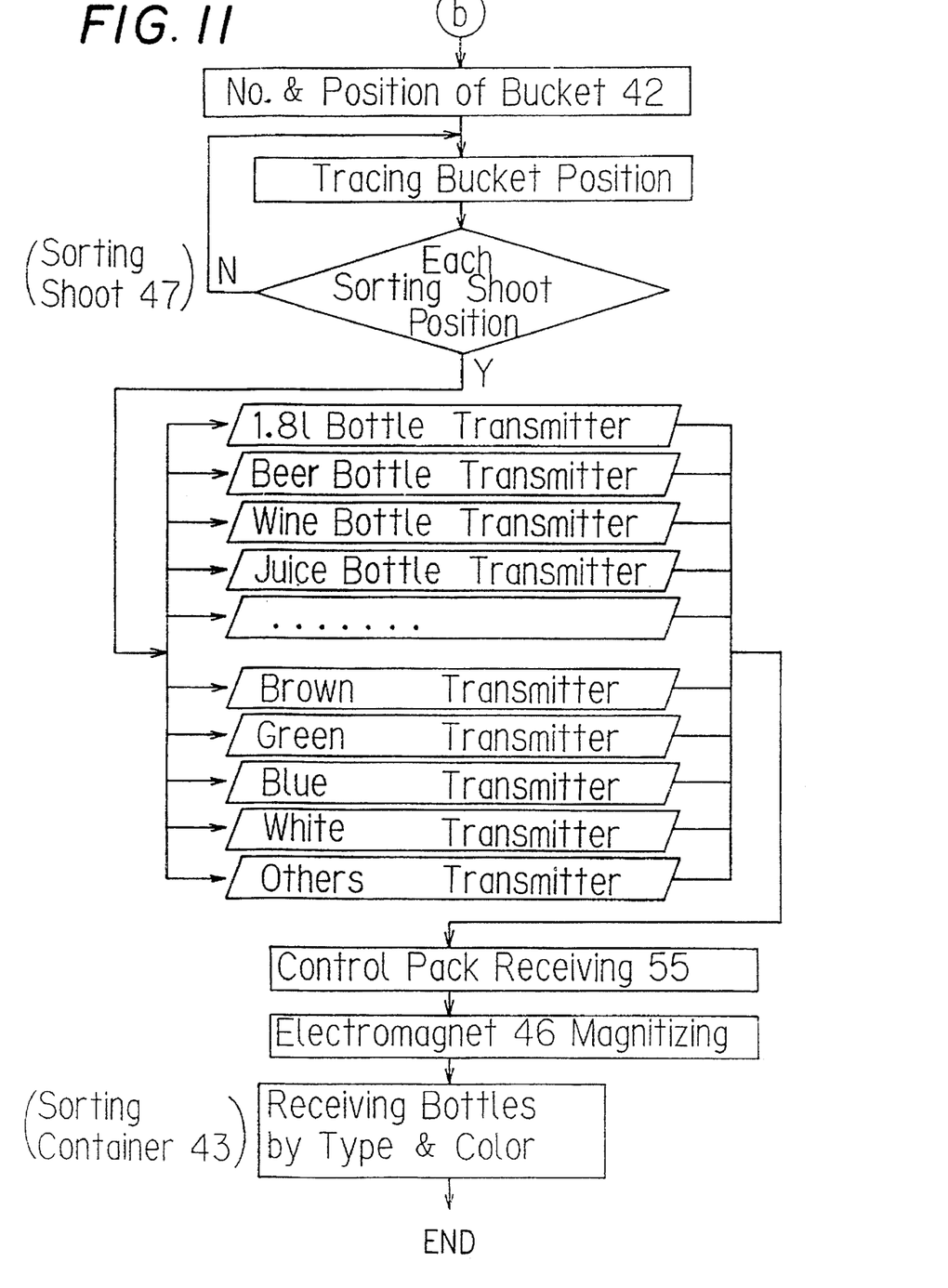
Figure 12:
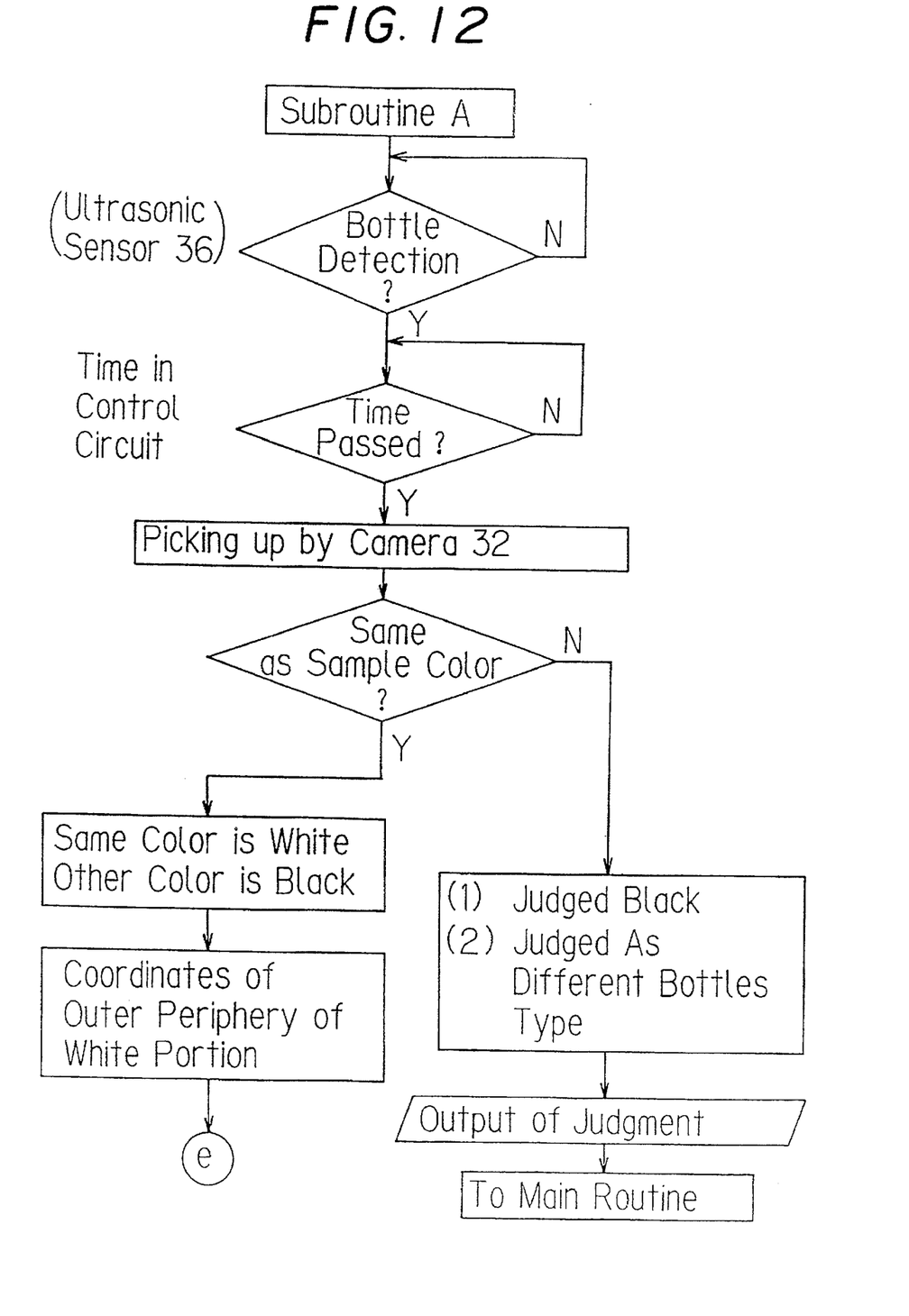
Figure 13:
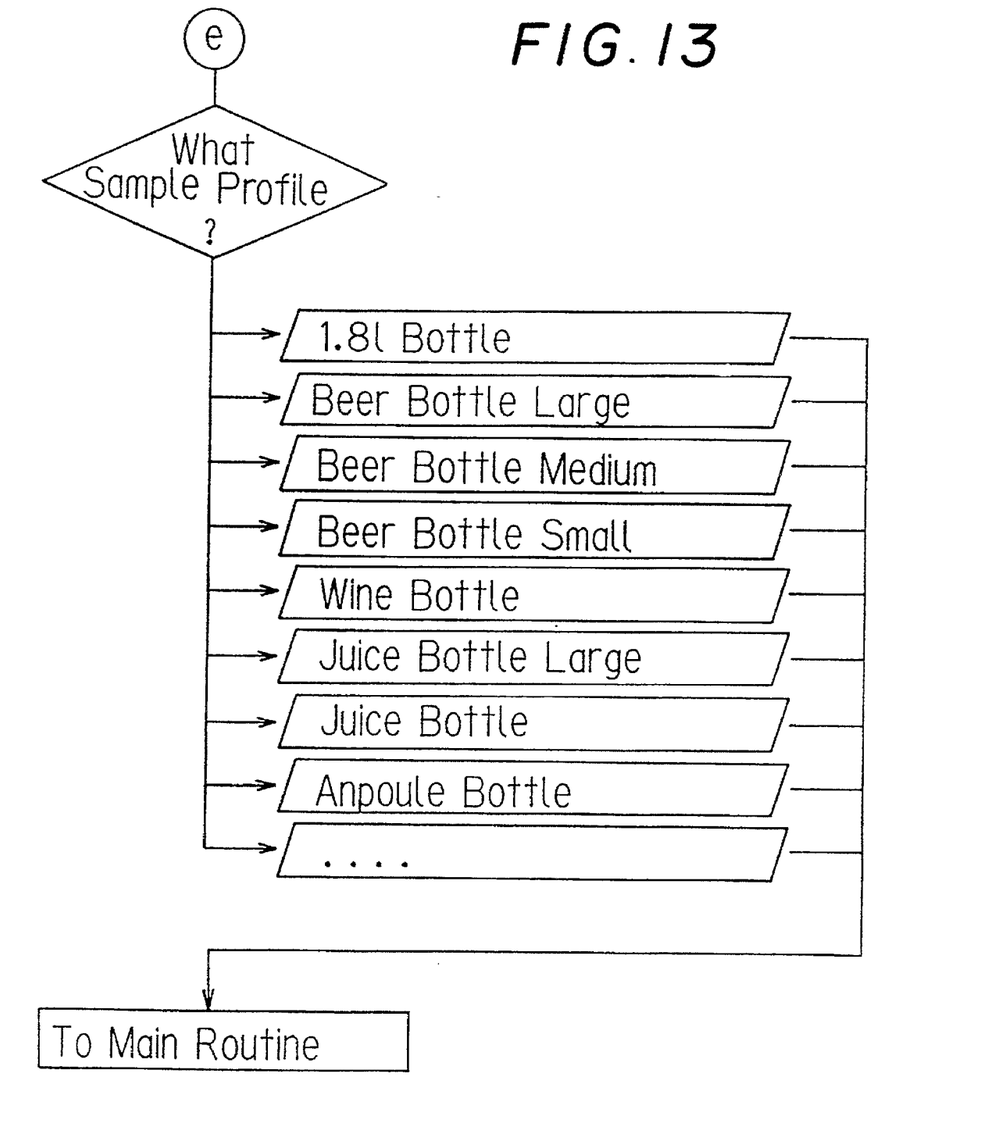
Figure 14:
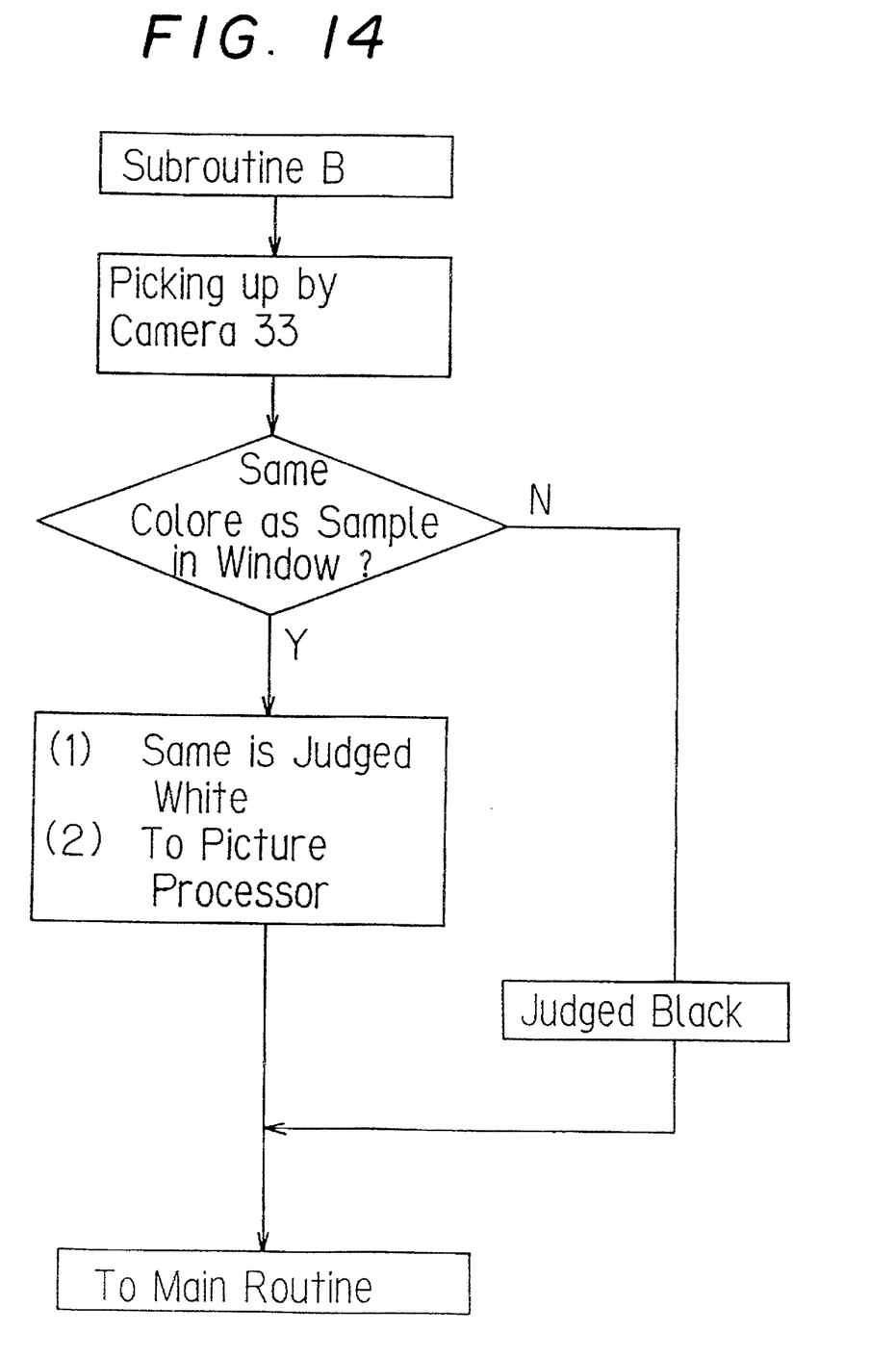

When the running bucket 42 has reached a position in front of a discharge shoot 47 disposed on the front face of a sorted bottle receiving container 43, of that type which is coincident with the detected bottle type, an encoder 53 detects that the data of the post-consumed bottle is coincident with the stored position in the control section, and a transmitter 54 of the sorting shoot 47, provided on the side frame of the shoot 47, generates an infrared ray. The infrared ray reaches a light receiving window 56 of a running control pack 55, thereby releasing the magnetization of the electromagnet 46. Accordingly, the bottom plate 44 of the bucket 42 opens downwardly as shown in FIG. 8(B), and the post-consumed bottle M drops down through the sorting shoot 47 to be finally received in one of the bottle receiving containers 43. When the bucket 42 moves forward further between sprockets 48 for driving the respective chain conveyors, the bottom plate 44 is raised by disks 49 fixed between the two sprockets and turning together in the same direction, and the bottom plate is electromagnetically attracted to the magnetized electromagnet 46, thereby turning and returning to the flat closed state. The bucket moves to the backside following the running of the chain conveyors, and repeats its rotation endlessly to receive classified bottles M from the detecting section and discharge them at all times at a position instructed by the information from the controller 5 to the appropriate receiving containers.

It is to be noted that one of the significant features of the present invention consists in the performance of accurate classification of post-consumed bottles in a very short time, which has been heretofore impossible, and this is achieved by incorporating highly advanced information processing functions in the entire apparatus for overall control of the entire operation. By fully operating the noted functions, even differences in bottle design, diversified and complicated due to recent trends in the individualization of goods, can be detected. And for the purpose of rebottling and recycling of post-consumed bottles, not always economical up to the present, exact classification can be achieved at a high speed. The control section 5 provides an information path for every section, to which detected values are inputted. The control section 5 operates according to a computer program, and outputs execution instructions for the required operations.

FIGS. 9 to 14 show several slow diagrams of the general operations, to thereby explain every step in association with the supply section, separating section, detecting section and sorting section which have already been described.

It is further understood by those skilled in the art that the foregoing description is a preferred embodiment of the disclosed device and that various changes and modifications may be made in the invention without departing from the spirit and scope thereof.

What is claimed is:

1. A method for sorting post-consumed bottles comprising the steps of:

charging post-consumed bottles having a longitudinal direction, contour, size and color into a hopper where they are randomly mixed, the hopper having a lower side defining a supply port;

causing the post-consumed bottles to form a row in their longitudinal direction after passing through the supply port provided on the lower side of the hopper while applying a vibration to the hopper thereby moving forward the post-consumed bottles one by one on a supply conveyor;

separating each post-consumed bottle to have a certain distance between one post-consumed bottle and another by intermittently interrupting a moving flow of the post-consumed bottles by a gate regularly opening and closing on a separation conveyor onto which the moving post-consumed bottles are delivered;

detecting the contour and size of each post-consumed bottle by processing an image picked up by a first image pickup device comprising one of a first image pickup camera and an ultrasonic displacement sensor on a detection conveyor onto which the separated post-consumed bottle is delivered;

detecting color at a high speed by picking up an image by a second image pickup device comprising an image pickup camera, the image being defined by data obtained from the contour and size detecting step; and discharging the used post-consumed bottles of which the size, shape and color have been detected at predetermined positions by comparison with preliminarily established size, shape and color data.

2. A method for sorting post-consumed bottles according to claim 1, wherein at least one of length, width, and diameter of post-consumed bottles are approximately detected by the ultrasonic displacement sensor.

3. An apparatus for sorting post-consumed bottles comprising:

a supply section for receiving post-consumed bottles having a longitudinal direction randomly mixed without order and moving the post-consumed bottles continuously and in the longitudinal direction of the post-consumed bottles such that the post-consumed bottles form a row;

a separating section for separating continuously each moving post-consumed bottle in the row to have a certain distance between one post-consumed bottle and another;

a detecting section for picking up the contour, size and color of each post-consumed bottle and classifying the post-consumed bottles into several types according to predetermined standard bottle patterns;

a sorting section for sorting and discharging the post-consumed bottles by said predetermined standard bottle patterns in accordance with data from said detecting section; and a control section for continuously providing a controlling series of operations to said respective sections, wherein said supply section and said separating section each comprise a belt conveyor with the belt conveyor of said separating section running at a higher speed than the belt conveyor of said supply section, a plate-like gate rotatably supported near the end of said supply section belt conveyor, two motors for turning a shaft of said plate-like gate alternately in one direction and a reverse direction regularly, and an operation controller for said motors.

4. An apparatus for sorting post-consumed bottles according to claim 3, wherein said detecting section comprises a belt conveyor, a first image pickup device comprising at least one of a first image pickup camera and an ultrasonic displacement sensor performing an image pickup for classifying size and contour of post-consumed bottles in connection with the control section, and a second image pickup device comprising an image pickup camera performing an image pickup defined for classifying color of the post consumed bottles at a speed in accordance with said detected size.

5. An apparatus for sorting post-consumed bottles according to claim 4, wherein said ultrasonic displacement sensor is disposed at a required position, and connected to said second image pickup device through the control section.

6. An apparatus for sorting post-consumed bottles according to claim 4, wherein said sorting section comprises two parallel chain conveyors both running in a direction perpendicular to and under an end of said belt conveyor of the detecting section; a plurality of plate-like buckets each connected to said control section and supported so as to open and close freely with its one side serving as a shaft; and sorting containers respectively disposed under openings of the plate-like buckets.

7. An apparatus for sorting post-consumed bottles according to claim 4, wherein said first image pickup device comprises said first image pickup camera and said control section forms an information system for timely and continuously giving operating instructions including a first detecting operation for detecting the size of post-consumed bottles by picture-processing images picked up by said first image pickup camera of the detecting section and counting the number of picture elements, and for identifying the type of bottle by comparing the contour of each picked-up bottle image with standard bottle contours preliminarily stored in the control section; a second detecting operation for picture-processing images picked up by said second image pickup device by receiving data detected by said first image pickup camera and selecting a number of windows and positions thereof to be adopted, and identifying the color of every bottle by comparing the color of each bottle with standard bottle colors preliminarily stored in the control section.

8. An apparatus for sorting post-consumed bottles according to claim 3, wherein said detecting section comprises a belt conveyor and said sorting section comprises two parallel chain conveyors both running in a direction perpendicular to and right under an end of said belt conveyor of the detecting section; a plurality of plate-like buckets each connected to said control section and supported so as to open and close freely with its one side serving as a shaft; and sorting containers respectively disposed right under openings of the buckets.

9. An apparatus for sorting post-consumed bottles according to claim 8, wherein said detecting section comprises first and second image pickup cameras and said control section forms an information system for timely and continuously giving operating instructions including a first detecting operation for detecting the size of post-consumed bottles by picture-processing images picked up by said first image pickup camera of the detecting section and counting the number of picture elements, and for identifying the type of bottle by comparing the contour of each picked-up bottle image with standard bottle contours preliminarily stored in the control section; a second detecting operation for picture-processing images picked up by said second image pickup camera by receiving data detected by said first image pickup camera and selecting a number of windows and positions thereof to be adopted, and identifying the color of every bottle by comparing the color of each bottle with standard bottle colors preliminarily stored in the control section.

10. An apparatus for sorting post-consumed bottles according to claim 3, wherein said detecting section comprises first and second image pickup cameras and said control section forms an information system for timely and continuously giving instructions of operations including a first detecting operation for detecting the size of post-consumed bottles by picture-processing images picked up by said first image pickup camera of the detecting section and counting the number of picture elements, and for identifying the type of bottle by comparing the contour of each picked-up bottle image with standard bottle contours preliminarily stored in said control section; a second detecting operation for picture-processing, at a high speed, images picked up by said second image pickup camera by receiving data detected by said first image pickup camera and selecting a number of windows and positions thereof to be adopted, and identifying the color of every bottle by comparing the color of each bottle with standard bottle colors preliminarily stored in the control section.

11. An apparatus for sorting post-consumed bottles according to claim 3, wherein said detecting section comprises a belt conveyor, a first image pickup camera performing an image pickup for classifying the size and contour of post-consumed bottles in connection with the control section, and a second image pickup camera performing an image pickup defined for classifying the color of the post-consumed bottles at a speed in accordance with said detected size.

12. An apparatus for sorting post-consumed bottles according to claim 3, wherein said detecting section comprises a belt conveyor and said sorting section comprises two parallel chain conveyors both running in a direction perpendicular to and under an end of said belt conveyor of the detecting section; a plurality of plate-like buckets each connected to said control section and supported so as to open and close freely with its one side serving as a shaft; and sorting containers respectively disposed under openings of the plate-like buckets.

13. An apparatus for sorting post-consumed bottles according to claim 3, wherein said detecting section comprises first and second image pickup cameras and said control section forms an information system for timely and continuously giving operating instructions including a first detecting operation for detecting the size of post-consumed bottles by picture-processing images picked up by said first image pickup camera of the detecting section and counting the number of picture elements, and for identifying the type of bottle by comparing the contour of each picked-up bottle image with standard bottle contours preliminarily stored in the control section; a second detecting operation for picture-processing images picked up by said second image pickup camera by receiving data detected by said first image pickup camera and selecting a number of windows and positions thereof to be adopted, and identifying the color of every bottle by comparing the color of each bottle with standard bottle colors preliminarily stored in the control section.

* * * * *